(12) United States Patent
Zhang et al.

(10) Patent No.: US 12,367,543 B2
(45) Date of Patent: Jul. 22, 2025

(54) CHANNEL ATTENTION-BASED SWIN-TRANSFORMER IMAGE DENOISING METHOD AND SYSTEM

(71) Applicant: SOOCHOW UNIVERSITY, Suzhou (CN)

(72) Inventors: Li Zhang, Suzhou (CN); Qiang Dai, Suzhou (CN); Lei Zhao, Suzhou (CN); Bangjun Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/907,960

(22) PCT Filed: Dec. 30, 2021

(86) PCT No.: PCT/CN2021/143105
§ 371 (c)(1),
(2) Date: Aug. 29, 2022

(87) PCT Pub. No.: WO2023/092813
PCT Pub. Date: Jun. 1, 2023

(65) Prior Publication Data
US 2024/0193723 A1 Jun. 13, 2024

(30) Foreign Application Priority Data
Nov. 25, 2021 (CN) .......................... 202111414625.9

(51) Int. Cl.
*G06K 9/00* (2022.01)
*G06T 3/40* (2006.01)
(Continued)

(52) U.S. Cl.
CPC .................. *G06T 3/40* (2013.01); *G06T 5/50* (2013.01); *G06T 5/60* (2024.01); *G06T 5/70* (2024.01);
(Continued)

(58) Field of Classification Search
CPC ........... G06T 2207/20016; G06T 2207/20081; G06T 2207/20084; G06T 2207/20224;
(Continued)

(56) References Cited

U.S. PATENT DOCUMENTS

2024/0268700 A1* 8/2024 Liu .......................... G06T 7/11

FOREIGN PATENT DOCUMENTS

| CN | 110766632 A | 2/2020 |
|----|-------------|--------|
| CN | 112634146 A | 4/2021 |

(Continued)

OTHER PUBLICATIONS

Liang, Jingyun, et al. "Swinir: Image restoration using swin transformer." Proceedings of the IEEE/CVF international conference on computer vision. 2021. (Year: 2021).*

(Continued)

*Primary Examiner* — Avinash Yentrapati
(74) *Attorney, Agent, or Firm* — SZDC Law PC (57) ABSTRACT

The invention provides a channel attention (CA)-based Swin-Transformer image denoising method and system. A noisy image is inputted into a trained and optimized denoising network model. A shallow layer feature extraction network in the denoising network model first extracts shallow layer feature information such as noise and channels in the noisy image. The extracted shallow layer feature information is then inputted into a deep layer feature extraction network in the denoising network model to acquire deep layer feature information. Subsequently, the shallow layer feature information and the deep layer feature information are inputted into a reconstruction network of the denoising network model to perform feature fusion, so that a clear image can be obtained, thereby overcoming problems that an image denoising method based on a deep convolutional neural network is prone to a loss of details in an inputted (Continued)

noisy image and high computing memory and time consumption.

9 Claims, 3 Drawing Sheets

(51) Int. Cl.
G06T 5/50 (2006.01)
G06T 5/60 (2024.01)
G06T 5/70 (2024.01)

(52) U.S. Cl.
CPC ............... *G06T 2207/20016* (2013.01); *G06T 2207/20081* (2013.01); *G06T 2207/20084* (2013.01); *G06T 2207/20224* (2013.01)

(58) Field of Classification Search
CPC .... G06T 3/40; G06T 5/50; G06T 5/60; G06T 5/70; G06T 3/4007; G06N 3/045; G06N 3/08
See application file for complete search history.

(56) References Cited

FOREIGN PATENT DOCUMENTS

| CN | 113313201 A | 8/2021 |
|----|-------------|--------|
| CN | 113658057 A | 11/2021 |

OTHER PUBLICATIONS

Erfurt, Johannes, et al. "A study of the perceptually weighted peak signal-to-noise ratio (WPSNR) for image compression." 2019 IEEE International Conference on Image Processing (ICIP). IEEE, 2019. (Year: 2019).*

Zhang, Kai, et al. "Beyond a gaussian denoiser: Residual learning of deep cnn for image denoising." IEEE transactions on image processing 26.7 (2017): 3142-3155. (Year: 2017).*

Jingyun Liang et al., "SwinIR: Image Restoration Using Swin Transformer" arXiv:2018.10257v1[eess.IV] (Aug. 23, 2021).

* cited by examiner

CHANNEL ATTENTION-BASED SWIN-TRANSFORMER IMAGE DENOISING METHOD AND SYSTEM

This application is the National Stage Application of PCT/CN2021/143105, filed on Dec. 30, 2021, which claims priority to Chinese Patent Application No. 202111414625.9, filed on Nov. 25, 2021, which is incorporated by reference for all purposes as if fully set forth herein.

FIELD OF THE INVENTION

The present invention relates to the field of image processing technologies, and in particular, to a channel attention (CA)-based Swin-Transformer image denoising method and system.

DESCRIPTION OF THE RELATED ART

Image denoising is an important underlying computer vision task that holds great promise in photography, medical imaging, biology, and many other fields. The goal of image denoising is to recover noisy images to clear, noise-free images. In recent years, due to the great success of deep learning in the field of computer vision, a convolutional neural network (CNN) has been applied to image denoising tasks and achieved impressive performance. Currently, most state-of-the-art image denoising methods are based on CNNs and have achieved satisfactory results. For example, a residual non-local attention network (RIDNet) has been proposed to solve the denoising problem of real images. The RIDNet is a single-stage denoising network with feature attention. However, the RIDNet lacks adaptability to image content, which always leads to an over-smoothed artifact in an image after denoising. An attention-guided denoising CNN (ADNet) is mainly formed by a sparse block, a feature enhancement block, an attention block, and a reconstruction block for image denoising. A multi-level wavelet denoising CNN (MWCNN) can better work out a compromise between a receptive field size and computational efficiency, thereby significantly improving the effectiveness of image denoising tasks.

Recently, transformers have achieved excellent performance in the field of computer vision. A Swin-Transformer shows great application prospects because it integrates the advantages of a CNN and a transformer. On one hand, the Swin-Transformer has the advantage of processing large-size images with a CNN due to a local attention mechanism. On the other hand, the Swin-Transformer has the advantage of a transformer that long-distance dependencies can be established through a shifted window scheme. Although image denoising methods based on a deep CNN have significantly improved in performance, the methods still have some limitations. For example, the interaction between an image and a convolution kernel is content-independent, and convolution is not effective for modeling long-distance dependencies. Moreover, in most CNN-based denoising methods, all channel features are processed equally and are not adjusted according to the importance of the channel features. However, some noise is more important than other noise and should be given more weight. In addition, CNN-based denoising methods always lead to an over-smoothed artifact and lose many details of inputted noisy images because texture and edges cannot be obtained in the methods. These methods also lead to high consumption of computing memory and time and therefore cannot be applied in practice.

SUMMARY OF THE INVENTION

For this, a technical problem to be resolved by the present invention is to overcome problems in the prior art that an image denoising method based on a deep CNN is prone to a loss of details in an inputted noisy image and high consumption of computing memory and time.

To resolve the foregoing technical problems, the present invention provides a CA-based Swin-Transformer image denoising method, including the following steps:

step S1: acquiring an original high-resolution picture data set, and preprocessing the original high-resolution picture data set to obtain a training data set of a noisy image and a high-resolution image for training a denoising network model;

step S2: inputting the noisy image into a shallow layer feature extraction network in the denoising network model to extract feature information, to obtain a shallow layer feature map;

step S3: using the shallow layer feature map as an input of a deep layer feature extraction network in the denoising network model, and performing feature extraction to obtain a deep layer feature map, the deep layer feature extraction network including a plurality of CARSTB modules and one convolutional layer, where each CARSTB module includes one residual block and a plurality of channel attention Swin-Transformer layers (CA-STLs), each CA-STL is obtained by adding a CA module to each MSA module and MLP module in a Swin-Transformer layer, and after the CARSTB module extracts feature information of the shallow layer feature map and differentiates importance on the extracted information, the information passes through the convolutional layer to obtain the deep layer feature map;

step S4: performing feature fusion on the shallow layer feature map and the deep layer feature map to obtain a reconstructed image; and step S5: constraining a difference between the reconstructed image and the high-resolution image by using a loss function, and continuously adjusting parameters of the denoising network model until the denoising network model converges, to complete training of the denoising network model.

In an implementation of the present invention, in step 1, a method for adding noise to an original high-resolution image and performing preprocessing to obtain a training data set of a plurality of pairs of noisy images and high-resolution images for the denoising network model includes: adding Gaussian noise to the original high-resolution image, generating a noisy image and a high-resolution image, converting all images from an RGB color space into a YCbCr color space, only keeping a Y channel in YCbCr of each image, and further performing operations including rotation, flipping, and downscaling on the image to perform data augmentation.

In an implementation of the present invention, the image in the data set is downscaled to 0.5 times and 0.7 times the original through bicubic interpolation.

In an implementation of the present invention, in step S2, a method for inputting the noisy image into a shallow layer feature extraction network in the denoising network model to extract feature information, to obtain a shallow layer feature map is: inputting the noisy image into a 3×3 deep convolutional layer, to obtain the shallow layer feature map.

In an implementation of the present invention, in step S3, the convolutional layer in the deep layer feature extraction network is a 3×3 convolutional layer.

In an implementation of the present invention, in step S5, the loss function is:

$$l = \frac{1}{B}\sum_{k=1}^{B}\sqrt{\sum_{i=1}^{M}\sum_{j=1}^{N}(\hat{I}(i,j)-I(i,j))^2+\varepsilon^2},$$

where $\hat{I}(i,j)$ represents a pixel value in an $i^{th}$ row and $j^{th}$ column in a reconstructed image I, (i,j) represents a pixel value in an $i^{th}$ row and $j^{th}$ column in a high-resolution image I, M and N respectively represent a width and a height of an image, B represents a batch size of an inputted data set, and $\varepsilon$ is a Charbonnier penalty coefficient.

In an implementation of the present invention, after step S5, the method further includes: evaluating a peak signal-to-noise ratio indicator for a noisy image and a corresponding reconstructed image in a test set.

In an implementation of the present invention, a formula of evaluating the peak signal-to-noise ratio indicator is:

$$PSNR = 10\log_{10}\left(\frac{(2^n-1)^2}{MSE}\right),$$

where MSE represents a mean square error, and n represents a color depth of an image.

In an implementation of the present invention, the MSE is:

$$MSE = \frac{1}{MN}\sum_{i=1}^{M}\sum_{j=1}^{N}(\hat{I}(i,j)-I(i,j))^2,$$

where $\hat{I}(i,j)$ represents a pixel value in an $i^{th}$ row and $j^{th}$ column in a reconstructed image I, (i,j) represents a pixel value in an $i^{th}$ row and $j^{th}$ column in a high-resolution image I, and M and N respectively represent a width and a height of an image.

The present invention further provides a CA-based Swin-Transformer image denoising system, including:

a data preparation module, configured to: acquire an original high-resolution picture data set, and preprocess the original high-resolution picture data set to obtain a training data set of a noisy image and a high-resolution image for training a denoising network model;

a shallow layer feature extraction module, configured to input the noisy image into a shallow layer feature extraction network in the denoising network model to extract feature information, to obtain a shallow layer feature map;

a deep layer feature extraction module, configured to: use the shallow layer feature map as an input of a deep layer feature extraction network in the denoising network model, and perform feature extraction to obtain a deep layer feature map, the deep layer feature extraction network including a plurality of CARSTB modules and one convolutional layer, where each CARSTB module includes one residual block and a plurality of CA-STLs, each CA-STL is obtained by adding a CA module to each MSA module and MLP module in a Swin-Transformer layer, and after the CARSTB module extracts feature information of the shallow layer feature map and differentiates importance on the extracted information, the information passes through the convolutional layer to obtain the deep layer feature map;

an image reconstruction module, configured to perform feature fusion on the shallow layer feature map and the deep layer feature map to obtain a reconstructed image; and a training module, configured to: constrain a difference between the reconstructed image and the high-resolution image by using a loss function, and continuously adjust parameters of the denoising network model until the denoising network model converges, to complete training of the denoising network model.

Compared with the prior art, the foregoing technical solution of the present invention has the following advantages:

In the CA-based Swin-Transformer image denoising method and system in the present invention, a noisy image is inputted into a trained and optimized denoising network model. A shallow layer feature extraction network in the denoising network model first extracts shallow layer feature information such as noise and channels in the noisy image. The extracted shallow layer feature information is then inputted into a deep layer feature extraction network in the denoising network model to acquire deep layer feature information. Subsequently, the shallow layer feature information and the deep layer feature information are inputted into a reconstruction network of the denoising network model to perform feature fusion, so that a clear image can be obtained, thereby overcoming problems in the prior art that an image denoising method based on a deep CNN is prone to a loss of details in an inputted noisy image and high consumption of computing memory and time.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Embodiment 1

This embodiment provides a CA-based Swin-Transformer image denoising method, including the following steps.

Step S1: Acquire an original high-resolution picture data set, and preprocessing the original high-resolution picture data set to obtain a training data set of a plurality of pairs of noisy images and high-resolution images for a denoising network model.

Specifically, in the present invention, training is performed on 800 training images in an image denoising training data set DIV2K, and testing is performed on public reference data sets BSD68 and Set12 of image denoising. DIV2K is an image data set with high quality (a 2K resolution), and is formed by 800 training images, 100 validation images, and 100 test images. Set12 has 12 noisy images in different scenes, and BSD68 has 68 noisy images in different natural scenes.

Gaussian noise is added to the 800 high-resolution images in DIV2K to generate 800 pairs of noise/clear images as an initial training set D. All the images are converted from an RGB (red (R), green (G), and blue (B)) color space into a YCbCr (Y refers to a luma component, Cb refers to a blue-difference chroma component, and Cr refers to a red-difference chroma component) color space, and only a Y channel in YCbCr of each image is kept and is inputted into the model. In addition, each image is further rotated and flipped in the experiment, and the image in the data set is downscaled to 0.5 times and 0.7 times the original through bicubic interpolation to perform data augmentation, to eventually obtain a new large-scale training data set D'. In the current experiment, a training image is first cropped into a size of 128×128, and is then inputted into a training network model. The network model includes a shallow layer feature extraction network, a deep layer feature extraction network, and an image reconstruction network.

Step S2: Input the noisy image into a shallow layer feature extraction network in the denoising network model to extract feature information, to obtain a shallow layer feature map.

Specifically, in the shallow layer feature extraction network, an inputted noisy image first passes through a 3×3 deep convolutional layer in the shallow layer feature extraction network. In this way, feature information of the inputted noisy image is initially extracted. The feature information includes noise information, channel information, and the like in the image.

Step S3: Use the shallow layer feature map as an input of a deep layer feature extraction network in the denoising network model, and perform feature extraction to obtain a deep layer feature map.

Specifically, an output (that is, the feature information) of the shallow layer feature extraction network is the input of the deep layer feature extraction network. The deep layer feature extraction network includes a plurality of CARSTB modules (CARSTB blocks) and one 3×3 convolutional layer.

Figure 1:
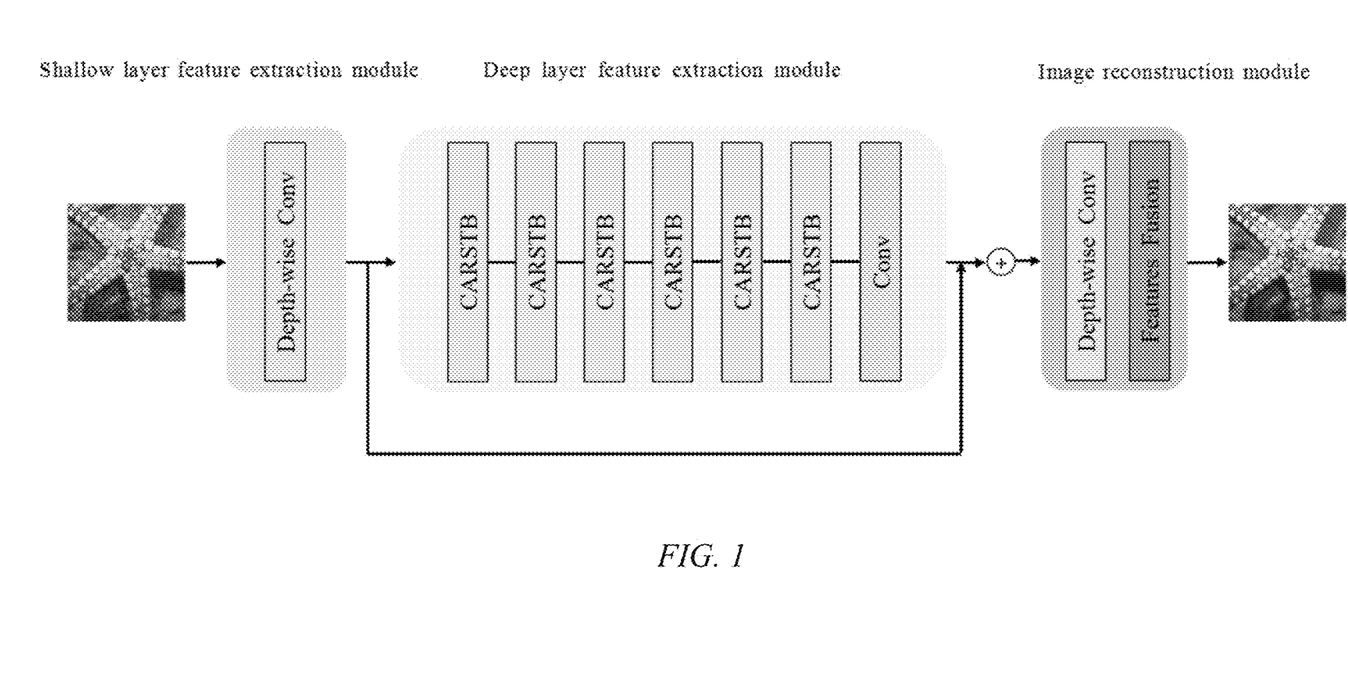
FIG. 1 is a structural diagram of a denoising network model based on a channel attention residual Swin-Transformer (CARSTB) according to the present invention.
Figure 2:
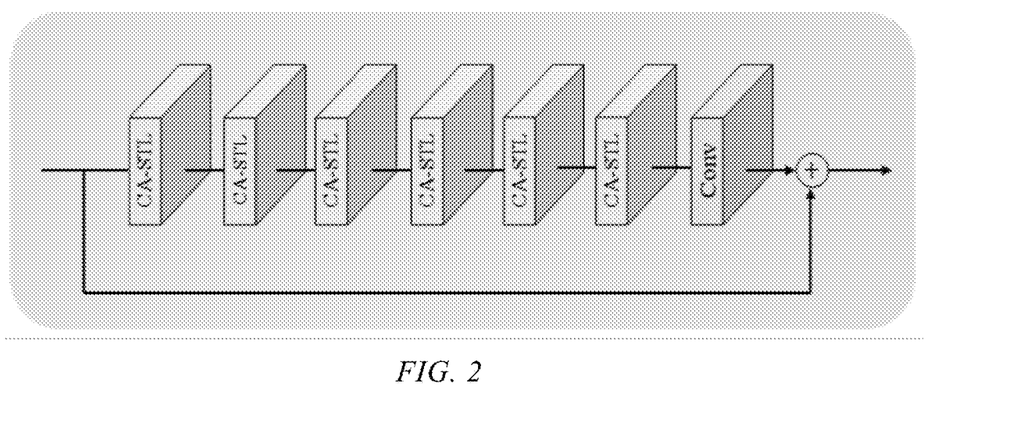
FIG. 2 is a structural diagram of a CARSTB module according to the present invention.

A single CARSTB module is shown in FIG. 2, and includes a residual block and a plurality of CA-STLs. A process of processing image data by the deep layer feature extraction network includes: extracting feature information from the shallow layer feature map inputted into the shallow layer feature extraction module by using the CARSTB module. Subsequently, importance is differentiated on the extracted information by using a CA mechanism. Finally, a quantity of channels is reduced to a quantity of input channels. The foregoing steps are repeated several times. Deep layer feature information is obtained after the information passes through the convolutional layer.

Figure 3:
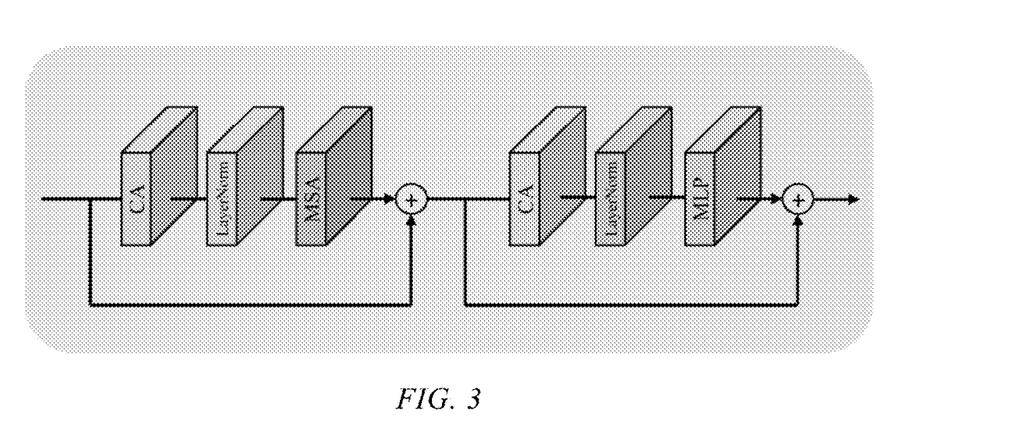
FIG. 3 is a structural diagram of a CA-STL according to the present invention.

The CA-STLs are shown in FIG. 3. The CA-STLs are obtained by modifying a Swin-Transformer layer in a Swin-Transformer. A CA module is respectively added to each Multi-head Attention (MSA) module and Multi-layer Perceptron (MLP) module in the Swin-Transformer layer to construct the CA-STL.

Figure 4:
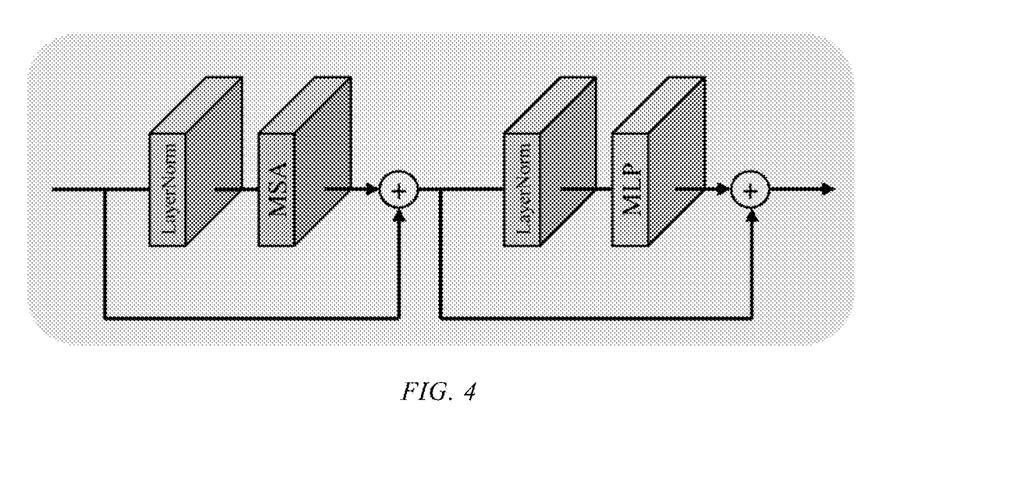
FIG. 4 is a structural diagram of a Swin-Transformer layer according to the present invention.

The Swin-Transformer layer is shown in FIG. 4. The Swin-Transformer layer is formed by one shifted window-based MSA module and one MLP module, between which a Gaussian Error Linear Unit (GELU) is used as an activation function. In addition, one LayerNorm (LN) layer is used before each MSA module and each MLP to perform normalization.

Figure 5:
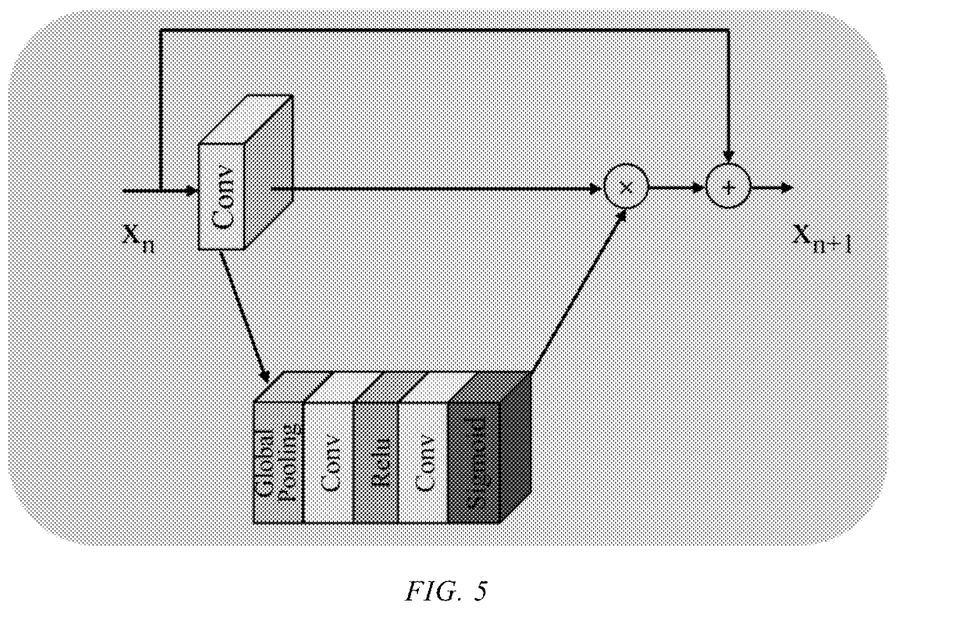
FIG. 5 is a diagram of a CA mechanism.

In the CA mechanism, a self-taught learning scheme is used to add an important image channel in a denoising network and compress an image channel that is useless for the network. This effectively reduces network parameters, making it easier to train the network. As shown in FIG. 5, after an image passes through the first convolutional layer, a feature map is compressed into a global pooling layer. Next, one 1×1 convolutional (Conv) layer is first used to compress a quantity of channels to 1/16 the original feature map. A quantity of channels of another 1×1 convolutional (Conv) layer is increased to be the same as the quantity of channels of the original feature map. There is also a ReLU activation layer in two 1×1 convolutional (Conv) layers. The two 1×1 convolutional layers generate one bottleneck structure. Finally, the feature map is standardized by using a Sigmoid activation function and an output is generated. The output is used for weighting an original output to form a self-taught CA mechanism.

Step S4: Input the deep layer feature map extracted from the deep layer feature extraction network and the shallow layer feature map extracted from the shallow layer feature extraction network into the image reconstruction network to perform feature fusion, and then obtain clear, noise-free reconstructed images.

Step S5: Constrain a difference between the reconstructed image and the high-resolution image by using a loss function, and continuously adjust parameters of the denoising network model until the denoising network model converges, to complete training of the denoising network model.

In the present invention, a difference between a denoised image and an original high-resolution noise-free image is constrained by using a Charbonnier loss function to continuously adjusting parameters of the model until the model converges, to complete training of the model. A training process is as follows: first, initializing a weight of a network, training the network by using a new training set D', and B is taken in each batch of training to minimize the following loss function:

$$l = \frac{1}{B}\sum_{k=1}^{B}\sqrt{\sum_{i=1}^{M}\sum_{j=1}^{N}(\hat{I}(i,j) - I(i,j))^2 + \varepsilon^2},$$

where $\hat{I}(i,j)$ represents a pixel value in an $i^{th}$ row and $j^{th}$ column in a reconstructed image I, (i,j) represents a pixel value in an $i^{th}$ row and $j^{th}$ column in a high-resolution image I, M and N respectively represent a width and a height of an image, B represents a batch size of an inputted data set and is set to 100 during training, and $\varepsilon$ is a Charbonnier penalty coefficient. In this example, $\varepsilon$=is 0.001.

In the present invention, 10 images in the validation set DIV2K are used as a validation set. The weight of the trained model in the model training module is finely adjusted according to a validation result. This process is continuously repeated until an optimal denoising network model is obtained through optimization.

In summary, in the present invention, a noisy image X is inputted into a trained and optimized denoising network model. A shallow layer feature extraction network in the denoising network model first extracts shallow layer feature information such as noise and channels in the noisy image. The extracted shallow layer feature information is then inputted into a deep layer feature extraction network in the denoising network model to acquire deep layer feature information. Subsequently, the shallow layer feature information and the deep layer feature information are inputted into a reconstruction network of the denoising network model to perform feature fusion, so that a clear image $X_{clear}$ can be obtained, thereby overcoming problems in the prior art that an image denoising method based on a deep CNN is prone to a loss of details in an inputted noisy image and high consumption of computing memory and time.

The effects of the present invention can be validated by using the following experiment.

On 80 test images, image reconstruction in step 3 is repeated, so that 80 clear images can be obtained. A peak signal-to-noise ratio indicator is evaluated for the noisy images under test and corresponding clear images, that is:

$$PSNR = 10\log_{10}\left(\frac{(2^n - 1)^2}{MSE}\right),$$

where n represents a color depth of an image. In the current experiment, n=8;

$$MSE = \frac{1}{MN}\sum_{i=1}^{M}\sum_{j=1}^{N}\left(\hat{I}(i, j) - I(i, j)\right)^2.$$

Compared with other existing methods on the same data set, the experimental results are shown in Table 1 and Table 2. As can be seen from Table 1 and Table 2, satisfactory results are obtained for the peak signal-to-noise ratio in the present invention.

TABLE 1

Performance comparison between methods on a data set Set12

| Method | Noise level | | |
|---|---|---|---|
| | Level: 15 PSNR | Level: 25 PSNR | Level: 50 PSNR |
| BM3D | 32.37 | 29.97 | 26.72 |
| WNNM | 32.70 | 30.26 | 27.05 |
| TNRD | 32.50 | 30.06 | 26.81 |
| ECNDNet | 32.81 | 30.39 | 27.15 |
| DnCNN [ | 32.86 | 30.43 | 27.18 |
| PSN-K | 32.86 | 30.53 | 27.30 |
| BRDNet | 33.03 | 30.61 | 27.45 |
| ADNet | 32.98 | 30.58 | 27.37 |
| NLRN | 33.16 | 30.80 | 27.64 |
| FOCNet | 33.07 | 30.73 | 27.68 |
| RNAN | — | — | 27.70 |
| MWCNN | 33.15 | 30.79 | 27.74 |
| DRUNet | 33.25 | 30.94 | 27.90 |
| The present invention | 33.38 | 31.02 | 27.93 |

TABLE 2

Performance comparison between methods on a data set BSD68

| Method | Noise level | | |
|---|---|---|---|
| | Level: 15 PSNR | Level: 25 PSNR | Level: 50 PSNR |
| BM3D | 31.07 | 28.57 | 25.62 |
| WNNM | 31.37 | 28.83 | 25.87 |
| TNRD | 31.42 | 28.92 | 25.97 |
| ECNDNet | 31.71 | 29.22 | 26.23 |
| DnCNN | 31.72 | 29.23 | 26.23 |
| PSN-K | 31.70 | 29.27 | 26.32 |
| BRDNet | 31.79 | 29.29 | 26.36 |
| ADNet | 31.74 | 29.25 | 26.29 |
| NLRN | 31.88 | 29.41 | 26.47 |
| FOCNet | 31.83 | 29.38 | 26.50 |
| RNAN | — | — | 26.48 |
| MWCNN | 31.86 | 29.41 | 26.53 |
| DRUNet | 31.91 | 29.48 | 26.59 |
| The present invention | 31.99 | 29.53 | 26.59 |

Embodiment 2

Based on the same inventive concept, this embodiment provides a CA-based Swin-Transformer image denoising system. The principle of solving the problems is similar to that of the CA-based Swin-Transformer image denoising method. Details are not repeated.

The embodiments provide a CA-based Swin-Transformer image denoising system, including:

a data preparation module, configured to: acquire an original high-resolution picture data set, and preprocess the original high-resolution picture data set to obtain a training data set of a noisy image and a high-resolution image for training a denoising network model;

a shallow layer feature extraction module, configured to input the noisy image into a shallow layer feature extraction network in the denoising network model to extract feature information, to obtain a shallow layer feature map;

a deep layer feature extraction module, configured to: use the shallow layer feature map as an input of a deep layer feature extraction network in the denoising network model, and perform feature extraction to obtain a deep layer feature map, the deep layer feature extraction network including a plurality of CARSTB modules and one convolutional layer, where each CARSTB module includes one residual block and a plurality of CA-STLs, each CA-STL is obtained by adding a CA module to each MSA module and MLP module in a Swin-Transformer layer, and after the CARSTB module extracts feature information of the shallow layer feature map and differentiates importance on the extracted information, the information passes through the convolutional layer to obtain the deep layer feature map;

an image reconstruction module, configured to perform feature fusion on the shallow layer feature map and the deep layer feature map to obtain a reconstructed image; and a training module, configured to: constrain a difference between the reconstructed image and the high-resolution image by using a loss function, and continuously adjust parameters of the denoising network model until the denoising network model converges, to complete training of the denoising network model.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A channel attention (CA)-based Swin-Transformer image denoising method, comprising steps of:
   step S1: acquiring an original high-resolution picture data set, and preprocessing the original high-resolution picture data set to obtain a training data set of a noisy image and a high-resolution image for training a denoising network model;
   step S2: inputting the noisy image into a shallow layer feature extraction network in the denoising network model to extract feature information, to obtain a shallow layer feature map;
   step S3: using the shallow layer feature map as an input of a deep layer feature extraction network in the denoising network model, and performing feature extraction to obtain a deep layer feature map, the deep layer feature extraction network comprising a plurality of CARSTB modules and one convolutional layer, wherein the CARSTB module comprises one residual block and a plurality of channel attention Swin-Transformer layers, the channel attention Swin-Transformer layer is obtained by adding a channel attention module to each MSA module and MLP module in a Swin-Transformer layer, and after the CARSTB module extracts feature information of the shallow layer feature map and differentiates importance on the extracted information, the information passes through the convolutional layer to obtain the deep layer feature map;
   step S4: performing feature fusion on the shallow layer feature map and the deep layer feature map to obtain a reconstructed image; and
   step S5: constraining a difference between the reconstructed image and the high-resolution image by using a loss function, and continuously adjusting parameters of the denoising network model until the denoising network model converges, to complete training of the denoising network model,
   wherein in step 1, a method for adding noise to an original high-resolution image and performing preprocessing to obtain a training data set of a plurality of pairs of noisy images and high-resolution images for the denoising network model comprises: adding Gaussian noise to the original high-resolution image, generating a noisy image and a high-resolution image, converting all images from an RGB color space into a YCbCr color space, only keeping a Y channel in YCbCr of each image, and further performing operations comprising rotation, flipping, and downscaling on the image to perform data augmentation.

2. The CA-based Swin-Transformer image denoising method according to claim 1, wherein the image in the data set is downscaled to 0.5 times and 0.7 times the original through bicubic interpolation.

3. The CA-based Swin-Transformer image denoising method according to claim 1, wherein in step S2, a method for inputting the noisy image into a shallow layer feature extraction network in the denoising network model to extract feature information, to obtain a shallow layer feature map comprises: inputting the noisy image into a 3×3 deep convolutional layer, to obtain the shallow layer feature map.

4. The CA-based Swin-Transformer image denoising method according to claim 1, wherein in step S3, the convolutional layer in the deep layer feature extraction network is a 3×3 convolutional layer.

5. The CA-based Swin-Transformer image denoising method according to claim 1, wherein in step S5, the loss function is:

$$l = \frac{1}{B}\sum_{k=1}^{B}\sqrt{\sum_{i=1}^{M}\sum_{j=1}^{N}\left(\hat{I}(i,j) - I(i,j)\right)^2 + \varepsilon^2},$$

wherein $\hat{I}(i,j)$ represents a pixel value in an $i^{th}$ row and $j^{th}$ column in a reconstructed image I, I (i,j) represents a pixel value in an $i^{th}$ row and $j^{th}$ column in a high-resolution image I, M and N respectively represent a width and a height of an image, B represents a batch size of an inputted data set, and ε is a Charbonnier penalty coefficient.

6. The CA-based Swin-Transformer image denoising method according to claim 1, wherein after step S5, the method further comprises: evaluating a peak signal-to-noise ratio indicator for a noisy image and a corresponding reconstructed image in a test set.

7. The CA-based Swin-Transformer image denoising method according to claim 1, wherein a formula of evaluating the peak signal-to-noise ratio indicator is:

$$PSNR = 10\log_{10}\left(\frac{(2^n - 1)^2}{MSE}\right),$$

wherein MSE represents a mean square error, and n represents a color depth of an image.

8. The CA-based Swin-Transformer image denoising method according to claim 1, wherein the MSE is:

$$MSE = \frac{1}{MN}\sum_{i=1}^{M}\sum_{j=1}^{N}(\hat{I}(i, j) - I(i, j))^2,$$

wherein $\hat{I}(i,j)$ represents a pixel value in an $i^{th}$ row and $j^{th}$ column in a reconstructed image I, I(i,j) represents a pixel value in an $i^{th}$ row and $j^{th}$ column in a high-resolution image I, and M and N respectively represent a width and a height of an image.

9. A channel attention (CA)-based Swin-Transformer image denoising system, comprising:
   a data preparation module, configured to: acquire an original high-resolution picture data set, preprocess the original high-resolution picture data set to obtain a training data set of a noisy image and a high-resolution image for training a denoising network model, add Gaussian noise to the original high-resolution image, generate a noisy image and a high-resolution image, convert all images from an RGB color space into a YCbCr color space, only keep a Y channel in YCbCr of each image, further perform operations comprising rotation, flipping, and downscale on the image to perform data augmentation;
   a shallow layer feature extraction module, configured to input the noisy image into a shallow layer feature extraction network in the denoising network model to extract feature information, to obtain a shallow layer feature map;
   a deep layer feature extraction module, configured to: use the shallow layer feature map as an input of a deep layer feature extraction network in the denoising network model, and perform feature extraction to obtain a deep layer feature map, the deep layer feature extraction network comprising a plurality of CARSTB modules and one convolutional layer, wherein the CARSTB module comprises one residual block and a plurality of channel attention Swin-Transformer layers, the channel attention Swin-Transformer layer is obtained by adding a channel attention module to each MSA module and MLP module in a Swin-Transformer layer, and after the CARSTB module extracts feature information of the shallow layer feature map and differentiates importance on the extracted information, the information passes through the convolutional layer to obtain the deep layer feature map;
   an image reconstruction module, configured to perform feature fusion on the shallow layer feature map and the deep layer feature map to obtain a reconstructed image; and
   a training module, configured to: constrain a difference between the reconstructed image and the high-resolution image by using a loss function, and continuously adjust parameters of the denoising network model until the denoising network model converges, to complete training of the denoising network model.

* * * * *